United States Patent Office 3,780,165
Patented Dec. 18, 1973

3,780,165
SYNTHESIS OF CHLORINE FLUOROSULFATE AND BROMINE (I) FLUOROSULFATE
Carl J. Schack, Chatsworth, and Richard D. Wilson, Canoga Park, Calif., assignors to North American Rockwell Corporation
No Drawing. Filed Dec. 21, 1970, Ser. No. 100,369
Int. Cl. C01b 17/45
U.S. Cl. 423—466      4 Claims

ABSTRACT OF THE DISCLOSURE

This application discloses new processes for the preparation of chlorine fluorosulfate and bromine (I) fluorosulfate. Chlorine fluorosulfate is prepared by the reaction of chlorine monofluoride with sulfur trioxide. Bromine (I) fluorosulfate is prepared by the reaction of bromine with chlorine fluorosulfate.

BACKGROUND OF THE INVENTION (1) Field of the invention

This invention is in the field of inorganic chemistry and particularly in the field of halogen fluorosulfates.

(2) Description of the prior art

Chlorine fluorosulfate and bromine (I) fluorosulfate are known compounds. These halogen fluorosulfates have previously been prepared by the reaction of peroxydisulfuryl difluoride ($S_2O_6F_2$) with the appropriate halogen. More specifically, chlorine fluorosulfate has been produced by the combination of chlorine with peroxydisulfuryl difluoride at about 125° C. [Inorg. Chem., 2, 496 (1963)] and bromine (I) fluorosulfate has been prepared by treating peroxydisulfuryl difluoride with excess bromine at room temperature [J. Am. Chem. Soc., 82, 352 (1960)]. It has been reported, however, that the use of peroxydisulfuryl difluoride may be hazardous if the potentially explosive impurity, fluorine fluorosulfate, is not completely removed [Chem. Eng. News, 44 (8), 40 (1966)].

Bromine has been observed to react with excess fluorine fluorosulfate at room temperature to form a liquid product having the empirical formula $Br_2 \cdot 3SO_3F_2$ [Inorg. Chem., 2, 496 (1963)].

Chlorine monofluoride has been shown to react in a variety of ways. For example, it can function as either a Lewis acid forming the $ClF_2^-$ anion or a Lewis base forming the $Cl_2F^+$ cation. In addition, it can act as a chlorinating agent [Inorg. Chem., 6, 1938 (1967); ibid., 7, 386 (1968)], a fluorinating agent [Angew. Chem., 76, 385 (1964)] or a chlorofluorinating material. The latter form of reaction can be either catalyzed [J. Am. Chem. Soc., 91, 2902 (1969); ibid., 91, 2907 (1969)] or uncatalyzed [Advan. Fluorine Chem., 1, 18 (1960)].

SUMMARY OF THE INVENTION

An object of the present invention is the provision of improved processes for the preparation of chlorine fluorosulfate and bromine (I) fluorosulfate. Further objects will become apparent upon reading the undergoing specification and claims.

Chlorine fluorosulfate is prepared in accordance with the present invention by the reaction of chlorine monofluoride with sulfur trioxide. This reaction is preferably conducted at about room temperature using about 10 mol percent excess chlorine monofluoride. Bromine (I) fluorosulfate is prepared in accordance with the present invention by reacting bromine with chlorine fluorosulfate. This reaction is conveniently conducted at about room temperature using about a 1:1 to 2:1 mole ratio of chlorine fluorosulfate to bromine.

DESCRIPTION OF THE INVENTION

It has been found that the reaction of chlorine monofluoride and sulfur trioxide produces chlorine fluorosulfate in excellent yield. This reaction can be represented as follows: $SO_3 + ClF \rightarrow ClOSO_2F$. The reaction sequence is an improvement over the previously reported preparation of chlorine fluorosulfate from chlorine and peroxydisulfuryl difluoride since the potentially explosive impurity fluorine fluorosulfate is never present and since the reaction can be conducted at about room temperature. In contrast to the reaction of chlorine monofluoride with thionyl fluoride ($SOF_2$) to prepare thionyl tetrafluoride ($SOF_4$) and the reaction of chlorine monofluoride with sulfur dioxide to prepare sulfuryl chloride fluoride ($ClSO_2F$) which only involve attack on the sulfur central atom, the reaction of chlorine monofluoride with sulfur trioxide results in addition across one of the S=O double bonds. Additionally, although the catalyzed conversion of thionyl tetrafluoride to chloroxysulfurpentafluoride ($SF_5OCl$) by chlorine monofluoride involves addition across one of the S=O double bonds of thionyl tetrafluoride, the present reaction is the first example of the uncatalyzed addition of chlorine monofluoride to an S=O group.

The reaction of chlorine monofluoride and sulfur trioxide can conveniently be conducted at a temperature of about —45 to 100° C.; however, this reaction is preferably conducted at a temperature of about 0 to 30° C. The chlorine fluorosulfate preparative reaction is usually essentially complete in an hour or less but longer reaction times can be employed if desired. While equimolar quantities of chlorine monofluoride and sulfur trioxide can readily be employed, it is preferred that chlorine monofluoride be employed in excess of the quantity theoretically required for complete reaction. It is generally preferred to employ about 10 mole percent excess chlorine monofluoride. However, the quantity of excess monofluoride employed is not critical and large excesses (e.g., 100 mole percent excess) can be used if desired. The chlorine fluorosulfate product is obtained in nearly quantitative yield and can be readily purified by vacuum fractionation or distillation.

It has been found that the reaction of bromine and chlorine fluorosulfate produces bromine (I) fluorosulfate in excellent yield. This reaction can be represented as follows: $Br_2 + 2ClOSO_2F \rightarrow Cl_2 + BrOSO_2F$. As with respect to the preparation of chlorine fluorosulfate in accordance with the present invention, the present process represents an improvement over the previously reported preparation of bromine (I) fluorosulfate from bromine and peroxydisulfuryl difluoride since the potentially explosive impurity fluoride fluorosulfate is never present. In contrast to the previously reported reaction of bromine with excess fluorine fluorosulfate to form the adduct $Br_2 \cdot 3SO_3F_2$, the present process results in the replacement of the chlorine atom of the chloroxy group of chlorine fluorosulfate with bromine.

The reaction of bromine with chlorine fluorosulfate is conveniently conducted at a temperature of about —45° to 80° C.; however, this reaction is preferably conducted at a temperature of about 0 to 30° C. The bromine (I) fluorosulfate preparative reaction is essentially complete in about 2 to 4 hours; however, it is preferred to allow the reaction to proceed for a longer period of time (e.g., about 8 hours). While equimolar quantities of bromine and chlorine fluorosulfate can readily be employed, it is preferred that bromine and chlorine fluorosulfate be employed in about a 1:2 mole ratio. When equimolar quantities of reactant are used, the resulting reaction will be represented as follows: $Br_2 + ClOSO_2F \rightarrow BrCl + BrOSO_2F$. Although the reaction can be run employing more than a 2:1 mole ratio of chlorine fluorosulfate to bromine, this is generally not preferred since a large excess of chlorine fluorosulfate may result in the formation of bromine (III) fluorosulfate [$Br(OSO_2F)_3$] rather than $BrOSO_2F$. The bromine (I) fluorosulfate product is obtained in nearly quantitative yield and can be readily purified by vacuum fractionation or distillation.

The reactions of the present invention can conveniently be conducted by condensing the reactants into prepassivated cylinders (e.g., stainless steel cylinders) and allowing the cylinders to warm to room temperature or, if required, heating cylinders to the reaction temperature.

Chlorine and bromine (I) fluorosulfate are useful, among other things, as fluorosulfating agents. For example, they will react with addition across the double bonds of haloolefins in nearly quantitative yield. For example, chlorine fluorosulfate will combine with tetrafluoroethylene to form 2-chlorotetrafluoroethyl fluorosulfate [Inorg. Chem., 2, 496 (1963)]. Additionally, the defluorosulfurylation of the addition products of chlorine or bromine (I) fluorosulfate with haloolefins leads to fluorocarbon acyl fluorides or ketones. Another example of the fluorosulfating capability of these compounds is the reaction of bromine (I) fluorosulfate with sulfur dioxide to give trisulfuryl fluoride ($S_3O_8F_2$). The oxygenating capability of these compounds is further illustrated by the reaction of bromine (I) fluorosulfate with phosphorus trifluoride to yield phosphoryl fluoride [Inorg. Chem., 5, 2184 (1966)].

The following non-limitative examples illustrate the invention:

EXAMPLE 1

Sulfur trioxide (191 cm.$^3$, 8.53 mmol) and chlorine monofluoride (230 cm.$^3$, 10.2 mmol) were separately condensed into a prepassivated 30-ml. stainless steel cylinder cooled to $-196°$ C. in a liquid nitrogen bath. The cylinder was slowly warmed to room temperature and allowed to remain at room temperature for 3 hours. The products were separated by fractional condensation in U-traps cooled to $-78$, $-95$, $-142$ and $-196°$ C. The $-142$ and $-196°$ C. fractions consisted of unreacted chlorine monofluoride with small amounts of chlorine and $SO_2F_2$. The other fractions contained the pale yellow product chlorine fluorosulfate in greater than 90% yield based on the amount of sulfur trioxide used.

EXAMPLE 2

Bromine (180 cm.$^3$, 8.04 mmol) and chlorine fluorosulfate (371.6 cm.$^3$, 16.6 mmol) were separately condensed into a prepassivated 30-ml. stainless steel cylinder cooled to $-196°$ C. in a liquid nitrogen bath. The cylinder was slowly warmed to room temperature. The reaction was allowed to proceed by maintaining the cylinder at room temperature for 1 day. The products were separated by fractional condensation in U-traps cooled to $-45$, $-78$ and $-196°$ C. The $-196°$ C. fraction (192 cm.$^3$, 8.57 mmol) was identified as nearly pure chlorine contaminated only slightly with $S_2O_5F_2$. The trap cooled to $-78°$ C. was completely empty while bromine (I) fluorosulfate (2.686 g., 15 mmol) was retained in the $-45°$ C. trap. The yield was 93% of theoretical.

We claim:
1. A method for preparing chlorine fluorosulfate of the formula $ClOSO_2F$ consisting of reacting chlorine monofluoride with sulfur trioxide at a temperature of about $-45$ to $+100°$ C. and then separating the reaction products and recovering chlorine fluorosulfate.
2. The method of claim 1 in which the reaction temperature is about 0 to 30° C.
3. The method of claim 1 in which the chlorine monofluoride is employed in excess of the quantity theoretically required for complete reaction with sulfur trioxide.
4. The method of claim 3 in which about 10 mole percent excess chlorine monofluoride is employed.

References Cited

UNITED STATES PATENTS

| | | | |
|---|---|---|---|
| 2,702,306 | 2/1955 | Gall et al. | 23—367 UX |
| 3,035,893 | 5/1962 | Roberts | 23—367 |

OTHER REFERENCES

Dudley et al., "Journal of the American Chemical Society," Vol. 78, pp. 290–292 (1956).

Gould et al., "Journal of the American Chemical Society," Vol. 91, pp. 1310–1313 (Mar. 12, 1969).

Gilbreath et al., "Inorganic Chemistry," Vol. 2, pp. 496–499 (1963).

Nickless, "Inorganic Sulphur Chemistry," 1968, pp. 436–438, 453–454.

MILTON WEISSMAN, Primary Examiner

U.S. Cl. X.R.

423—467

PO-1050
(5/69)

UNITED STATES PATENT OFFICE
CERTIFICATE OF CORRECTION

Patent No. 3,780,165    Dated December 18, 1973

Inventor(s) C. J. Schack et al

It is certified that error appears in the above-identified patent and that said Letters Patent are hereby corrected as shown below:

First paragraph after "Abstract of the Disclosure" insert the following paragraph:
--This invention herein described was made in the course of or under a contract or subcontract thereunder, (or grant) with the Department of the Navy.--

Column 2, line 52 "fluoride" should read --fluorine--

Signed and sealed this 26th day of November 1974.

(SEAL)
Attest:

McCOY M. GIBSON JR.
Attesting Officer

C. MARSHALL DANN
Commissioner of Patents